United States Patent
Lee et al.

(10) Patent No.: US 10,452,277 B2
(45) Date of Patent: Oct. 22, 2019

(54) MEMORY DEVICE AND OPERATING METHOD THEREOF

(71) Applicant: SK hynix Inc., Gyeonggi-do (KR)

(72) Inventors: Kwang Su Lee, Chungcheongbuk-do (KR); Tae Seung Shin, Chungcheongbuk-do (KR)

(73) Assignee: SK hynix Inc., Gyeonggi-do (KR)

( * ) Notice: Subject to any disclaimer, the term of this patent is extended or adjusted under 35 U.S.C. 154(b) by 30 days.

(21) Appl. No.: 15/250,856

(22) Filed: Aug. 29, 2016

(65) Prior Publication Data

US 2017/0293435 A1 Oct. 12, 2017

(30) Foreign Application Priority Data

Apr. 7, 2016 (KR) .......................... 10-2016-0042724

(51) Int. Cl.
*G06F 3/06* (2006.01)

(52) U.S. Cl.
CPC .......... *G06F 3/0611* (2013.01); *G06F 3/0607* (2013.01); *G06F 3/0659* (2013.01); *G06F 3/0679* (2013.01)

(58) Field of Classification Search
CPC ..... G06F 3/0607; G06F 3/0629; G06F 3/0679
See application file for complete search history.

(56) References Cited

U.S. PATENT DOCUMENTS

| | | | |
|---|---|---|---|
| 2005/0073896 A1* | 4/2005 | Kikuchi | G06F 13/4239 365/222 |
| 2017/0060477 A1* | 3/2017 | Kodera | G11C 16/20 |

FOREIGN PATENT DOCUMENTS

| | | |
|---|---|---|
| KR | 1020120005269 | 1/2012 |
| KR | 1020150045642 | 4/2015 |

* cited by examiner

*Primary Examiner* — Edward J Dudek, Jr.
(74) *Attorney, Agent, or Firm* — IP & T Group LLP

(57) ABSTRACT

The present disclosure relates to a memory device and an operating method thereof. A memory device includes an enable signal generation unit generating an enable signal in response to a command; a storage unit storing product information of the memory device; an information generation unit generating variable information of the memory device; and an output unit combining the product information from the storage unit with the variable information from the information generation unit and outputting the combined information in response to the enable signal.

18 Claims, 3 Drawing Sheets

MEMORY DEVICE AND OPERATING METHOD THEREOF

CROSS-REFERENCE TO RELATED APPLICATION

The present application claims priority under 35 U.S.C. § 119(a) to Korean patent application number 10-2016-0042724, filed on Apr. 7, 2016, the entire disclosure of which is incorporated herein by reference in its entirety.

BACKGROUND

Field of Invention

Various embodiments of the invention relate generally to a memory device and an operating method thereof.

Description of Related Art

Generally, a storage device may include a memory device storing data and a memory controller controlling the memory device.

Semiconductor memory devices may be classified into volatile memory devices and non-volatile memory devices. Non-volatile memory devices retain the stored data regardless of power on/off conditions. Volatile memory devices lose stored data when powered off.

Non-volatile memory devices are widely used as storage devices of portable electronic devices because they offer lower power consumption, reduced size and thickness, and increased capacity when compared to volatile memory devices. Hereinafter, a non-volatile memory device will be described as an example.

A memory device may include a memory cell array storing data, peripheral circuits configured to program, read and erase memory cells included in the memory cell array, and a control logic controlling the peripheral circuits.

SUMMARY

Various embodiments are directed to an improved non-volatile memory device (hereinafter also simply referred to as a memory device) capable of more quickly outputting read information, and an operating method thereof.

According to an embodiment, a memory device may include an enable signal generation unit generating an enable signal in response to a command; a storage unit storing product information of the memory device; an information generation unit generating variable information of the memory device; and an output unit combining the product information from the storage unit with the variable information from the information generation unit and outputting the combined information in response to the enable signal.

According to an embodiment, a memory device may include a plurality of memory blocks storing data; a peripheral circuit performing at least one of a program operation, a read operation and an erase operation on the plurality of memory blocks; and a control logic controlling the peripheral circuit, wherein the control logic is combining product information of the memory device with variable information of the memory device in response to a command, and outputting the combined information in response to a single internal clock.

According to an embodiment, a method of operating a memory device may include storing product information of the memory device; generating variable information of the memory device; generating read information by combining the product information with the variable information; and outputting the combined information in response to a single internal clock of the memory device.

BRIEF DESCRIPTION OF THE DRAWINGS

The above and other features and advantages of the present invention will become more apparent to those skilled in the art to which the present invention pertains by describing in detail various embodiments thereof with reference to the attached drawings in which.

DETAILED DESCRIPTION

Figure 1:
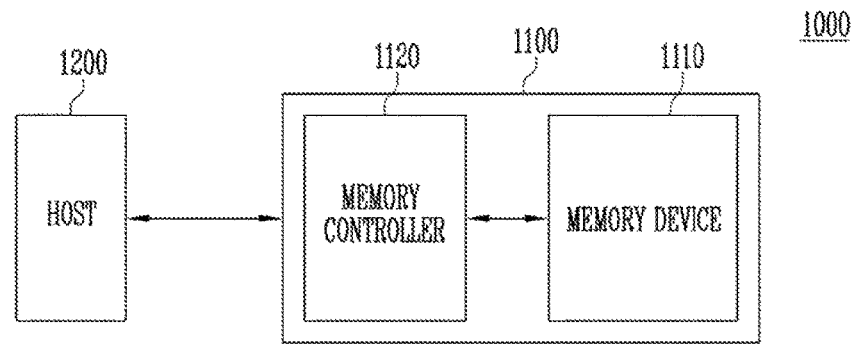
FIG. 1 is a simplified block diagram illustrating a memory system comprising a memory device and a memory controller, according to an embodiment of the present invention.

Various embodiments of the present invention relate to a semiconductor memory device capable of more quickly outputting read information, and an operating method thereof. The present invention may also exhibit improved reliability.

Although specific embodiments of the present invention are disclosed, the present invention, however, may be embodied in various different forms, and should not be construed as being limited only to the illustrated embodiments herein. Rather, these embodiments are provided as examples so that this disclosure will be thorough and complete, and will fully convey the various aspects and features of the present invention to those skilled in the art to which the present invention pertains.

The drawings are not necessarily to scale and, in some instances, proportions may have been exaggerated in order to more clearly illustrate the various elements of the embodiments. For example, in the drawings, the size of elements and the intervals between elements may be exaggerated compared to actual sizes and intervals for convenience of illustration.

It should be understood that, when it is described that an element is "coupled" or "connected" to another element, the element may be directly coupled or directly connected to the other element or coupled or connected to the other element through a third element. On the contrary, it should be understood that when an element is referred to as being "directly connected to" or "directly coupled to" another element, another element does not intervene therebetween. Other expressions which describe the relationship between components, that is, "between" and "directly between", or "adjacent to" and "directly adjacent to" should be interpreted in the same manner.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises", "comprising", "includes", and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element (also often referred to as a feature) described in connection with one embodiment may be used singly or in combination with other elements of another embodiment, unless otherwise specifically indicated.

Hereinafter, the various embodiments of the present invention will be described in detail with reference to the attached drawings.

FIG. 1 is a simplified block diagram illustrating a memory system 1000 according to an embodiment of the present invention.

Referring to FIG. 1, the memory system 1000 may include a storage device 1100 and a host 1200 controlling the storage device 1100. The storage device 1100 may include a memory device 1110 storing data and a memory controller 1120 controlling the memory device 1110.

The host 1200 may communicate with the storage device 1100 by using an interface protocol, such as a peripheral component interconnect Express (PCI-E), an advanced technology attachment (ATA), a serial ATA (SATA), a parallel ATA (PATA), or a serial attached SCSI (SAC). However, interface protocols between the host 1200 and the storage device 1100 may not be limited to the above-described examples. The host 1200 and the storage device 1100 may communicate with each other by using one of other interface protocols, such as universal serial bus (USB), multi-media card (MMC), enhanced Small Disk Interface (ESDI), and integrated drive electronics (IDE).

The memory controller 1120 may control the operations of the storage device 1100 including control of data exchange between the host 1200 and the memory device 1100. For example, the controller 1100 may control at least one of a read operation, a program operation, and an erase operation in response to a request received from the host 1200.

The memory device 1110 may be or include a Double Data Rate Synchronous Dynamic Random Access Memory (DDR SDRAM), a Low Power Double Data Rate4 (LPDDR4) SDRAM, a Graphics Double Data Rate (GDDR) SDRAM, a Low Power DDR (LPDDR), a Rambus Dynamic Random Access Memory (RDRAM), a Resistance Random Access Memory (ReRAM), a Spin Torque Transfer Magnetic Random Access Memory (STTMRAM), a Phase-Change Random Access Memory (PCRAM), a FLASH Memory and the like. In an embodiment, the memory device 1110 may be a flash memory.

Figure 2:
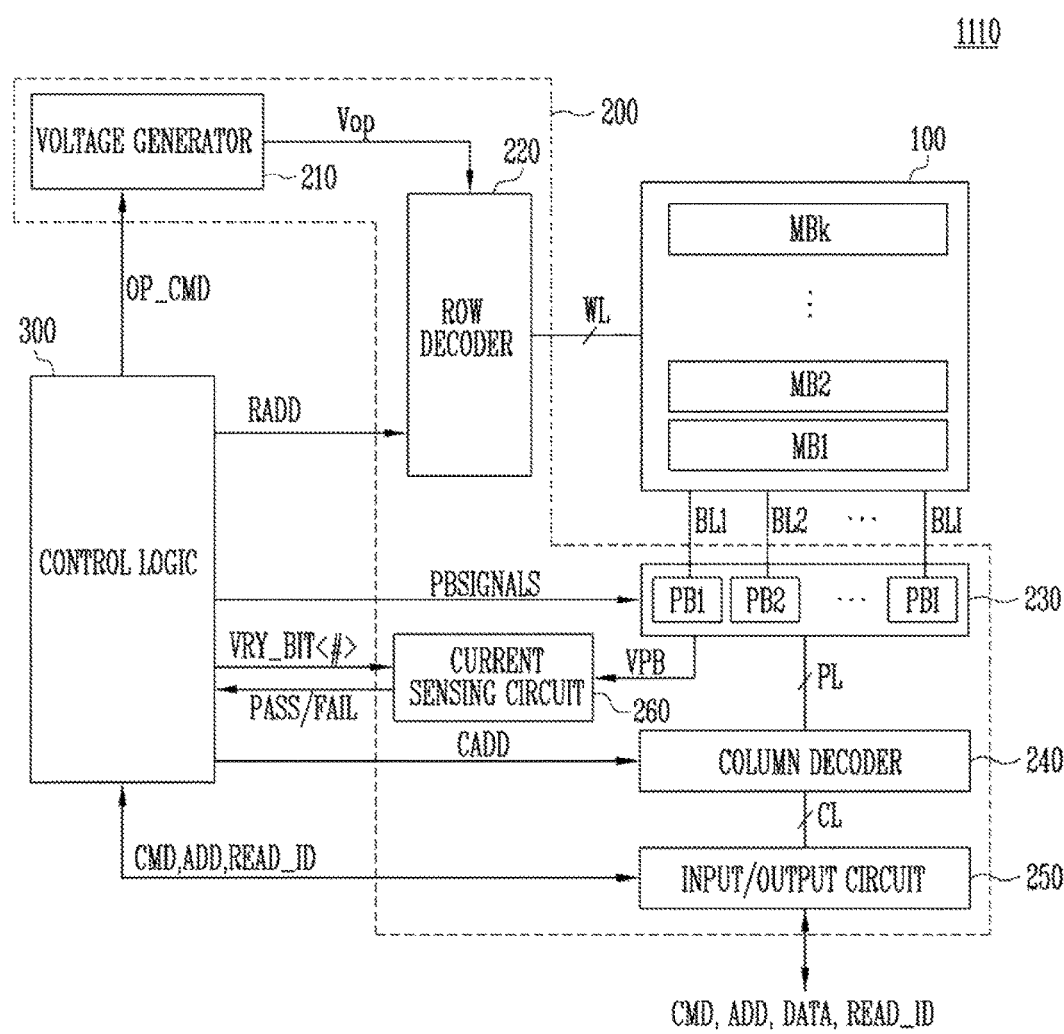
FIG. 2 is a simplified block diagram illustrating a configuration of the memory device of FIG. 1, according to an embodiment of the present invention.

FIG. 2 is a simplified block diagram illustrating the memory device 1110 shown in FIG. 1. The memory device 1110 may a flash memory.

Referring to FIG. 2, the memory device 1110 may include a memory cell array 100 for storing data, a peripheral circuit 200, and a control logic 300 controlling the peripheral circuit 200. The peripheral circuit 200 may be configured to perform a program operation to store data in the memory cell array 100, a read operation to output stored data from the memory cell array 100 to the host HOST, and an erase operation to erase the stored data in the memory cell array 100.

The memory cell array 100 may include a plurality of memory blocks MB1 to MBk, where k is a positive Integer. Word lines WL and bit lines BL1 to BLI may be coupled to the memory blocks MB1 to MBk, respectively, where I is a positive integer. Each of the word lines WL may be coupled to each of the memory blocks. The bit lines BL1 to BLI may be coupled in common to the memory blocks. Though not Illustrated in FIG. 2, in addition to the word lines WL, source selection lines, drain selection lines or pipe lines may be coupled to each of the memory blocks MB1 to MBk.

The peripheral circuit 200 may include a plurality circuits including a voltage generator 210, a row decoder 220, a page buffer unit 230, a column decoder 240, an input/output circuit 250 and a current sensing circuit 260.

The voltage generator 210 may generate various operating voltages Vop and transmit them to the row decoder 220. The voltages Vop may be used to perform a program, read or erase operation in response to an operation signal OP_CMD. For example, the operating voltages Vop may be or include a program voltage, a read voltage, an erase voltage, a pass voltage and a turn on voltage.

The row decoder 220 may provide the operating voltages Vop to the word lines WL coupled to a selected memory block in response to a row address RADD. Though not shown in FIG. 2, the row decoder 220 may provide the operating voltages Vop to the source selection lines, the drain selection lines or the pipe lines in response to the row address RADD.

The page buffer unit 230 may include a plurality of page buffers PB1 to PBI. Each page buffer PB1 to PBI may be coupled to the bit lines BL1 to BLI, respectively. The page buffers PB1 to PBI may operate in response to page buffer control signals PBSIGNALS received from the control logic 300. For example, the page buffers PB1 to PBI may temporarily store data received through the bit lines BL1 to BLI, or sense voltage or current in the bit lines BL1 to BLI during a read or verify operation. The verify operation may include a verify operation performed during a program operation and an erase operation.

The column decoder 240 may transfer data between the input/output circuit 250 and the page buffer unit 230 in response to a column address CADD received from the control logic 300. For example, the column decoder 240 may exchange data with the page buffers PB1 to PBI through the page lines PL, or may exchange data with the input/output circuit 250 through the column lines CL.

The input/output circuit 250 may transfer a command CMD and an address ADD received from the memory controller 1120 as shown in FIG. 1 to the control logic 300, or exchange data DATA with the column decoder 240. In addition, the input/output circuit 250 may output read information READ_ID received from the control logic 300.

The current sensing circuit 260 may generate a reference current in response to an allowable bit VRY_BIT<#> received from the control logic 300 and compare a sensing voltage VPB detected from the page buffer unit 230 with the reference current to output a pass signal PASS or a fail signal FAIL during a read operation or a verify operation.

The control logic 300 may control the peripheral circuit 200 by outputting the operation signal OP_CMD, the row address RADD, the page buffer control signal PBSIGNALS, the allowable bit VRY_BIT<#> and the read information READ_ID in response to the command CMD and the address ADD. In addition, the control logic 300 may determine whether the verify operation passes or fails in response to the pass or fall signal PASS or FAIL. The control logic 300 may store various kinds of information about the memory device 1110 and output the stored information in response to the request from the memory controller 1120 shown in FIG. 1. For example, the control logic 300 may store product information of the memory device 1110 and generate variable information which may change depending upon an operation to be performed. When receiving a command CMD to output read information, the control logic 300 may generate the read information READ_ID by combining a fix code corresponding to the product information with a logic code corresponding to the variable information, and output the read information READ_ID to the input/output circuit Input/Output Circuit.

Figure 3:
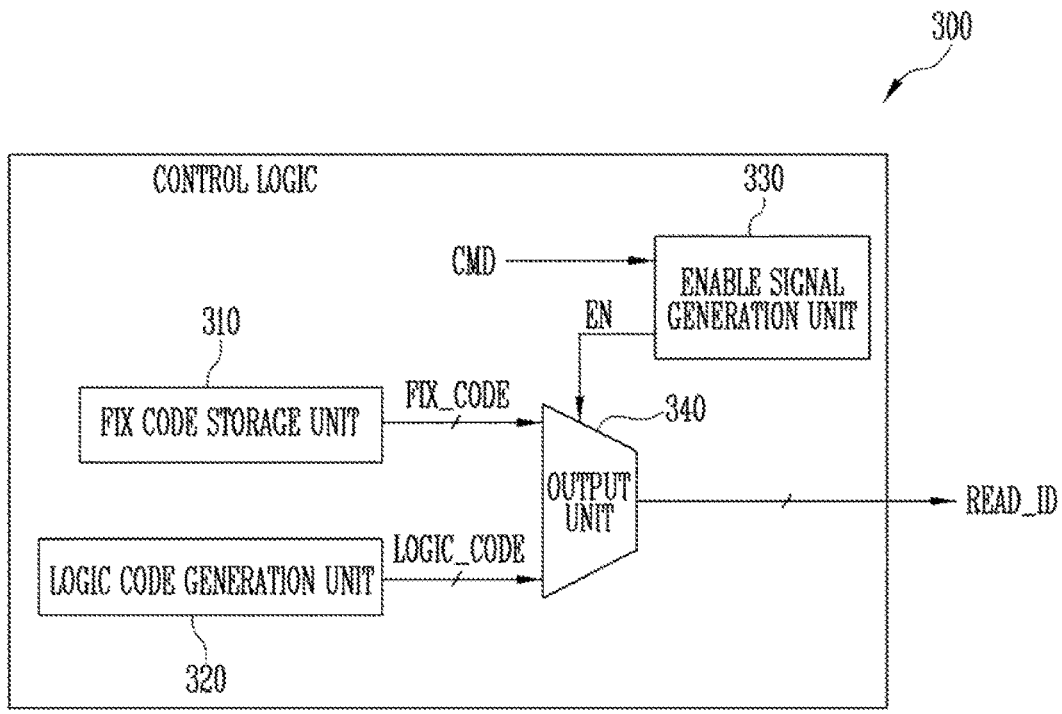
FIG. 3 is a simplified block diagram illustrating a control logic of the memory device of FIG. 2, according to an embodiment of the present invention.

FIG. 3 is a simplified block diagram illustrating a control logic 300, according to an embodiment of the present invention.

Referring to FIG. 3, the control logic 300 may include a fix code storage unit 310, a logic code generation unit 320, an enable signal generation unit 330 and an output unit 340.

The fix code storage unit 310 may be a storage unit to store a fix code FIX_CODE corresponding to product Information of the memory device 1110. The fix code FIX_CODE may be an invariable code, regardless of an operation and a state of the memory device 1110. For example, the fix code FIX_CODE may include manufacturing information and specification information of the memory device 1110 and be stored in the fix code storage unit 310 during manufacturing processes of the memory device 1110.

The logic code generation unit 320 may be a information generation unit to generate and store a logic code LOGIC_CODE which may change depending upon an operation and a state of the memory device 1110. For example, the logic code LOGIC_CODE may include information about voltages used for various operations performed by the memory device 1110, a cycling number and bad block information. The cycling number may refer to the number of times an erase operation and a program operation is performed. The logic code LOGIC_CODE may be updated according to the occurring changes during an operation of the memory device 1110.

The enable signal generation unit 330 may generate an enable signal EN in response to receiving a command CMD to output the read information READ_ID.

The output unit 340 may receive the fix code FIX_CODE and the logic code LOGIC_CODE from the fix code storage unit 310 and the local code generation unit, respectively, in response to the enable signal EN received from the enable signal generation unit. The output unit 340 may generate the read information READ_ID by combining the fix code FIX_CODE with the logic code LOGIC_CODE. In addition, the output unit 340 may output the read information READ_ID according to an internal clock. The output unit 340 may be or include a multiplexer. The output unit 340 and the logic code generation unit 320 may be coupled to each other through global data lines. The logic code generation unit 320 may transfer the logic code LOGIC_CODE to the output unit 340 through the global data lines.

The output unit 340 may output the read information READ_ID according to a single internal clock instead of outputting the fix code FIX_CODE and the logic code LOGIC_CODE according to different clocks. Therefore, the output unit 340 may output the read information READ_ID without restrictions of speed and timing of another operation being performed in the control logic 300. For example, when the control logic 300 operates in response to the Internal clock, the output unit 340 may also output the read information READ_ID in response to the Internal clock. Thus, the output unit 340 may quickly output the read information READ_ID including the fix code FIX_CODE and the logic code LOGIC_CODE regardless of another operation.

According to the above-described embodiment, the fix code storage unit 310, the logic code generation unit 320, the enable signal generation unit 330 and the output unit 340 may be included in the control logic 300. However, in another embodiment at least one of the fix code storage unit 310, the logic code generation unit 320, the enable signal generation unit 330 and the output unit 340 may be provided outside the control logic 300.

Figure 4:
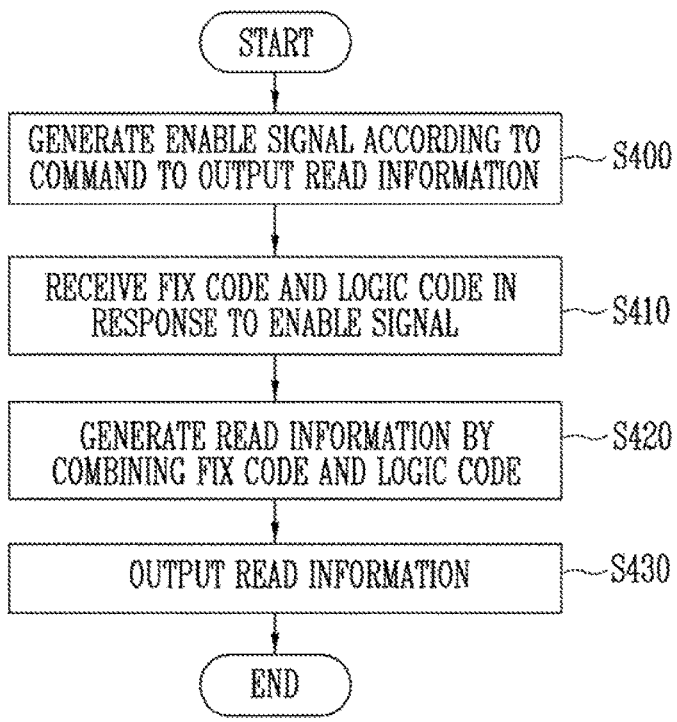
FIG. 4 is a flowchart illustrating a method of operating a memory device, according to an embodiment of the present invention.

FIG. 4 is a simplified flowchart Illustrating a method of operating a memory device 1110, according to an embodiment of the present invention.

Referring to FIG. 4, when the memory device 1110 as shown in FIG. 2 receives the command CMD as shown in FIG. 2 to output read information, the enable signal generation unit 330 shown in FIG. 3 may generate the enable signal EN at step S400. The generated enable signal EN may be transferred to the output unit 340 as shown in FIG. 3.

The output unit 340, as shown in FIG. 3, may receive the fix code FIX_CODE and the logic code LOGIC_CODE in response to the enable signal EN at step S410. The fix code FIX_CODE may be outputted from the fix code storage unit 310 as shown in and the logic code LOGIC_CODE may be outputted from the logic code generation unit 320 as shown in FIG. 3.

Subsequently, the output unit 340 may generate the read information READ_ID as shown in FIG. 3 by combining the fix code FIX_CODE with the logic code LOGIC_CODE at step S420.

The output unit 340 may output the generated read information READ_ID at step S430. For example, the read information READ_ID output from the output unit 340 may be transferred to the input/output circuit 250 as shown in FIG. 2, and the input/output circuit 250 may output the received read information READ_ID to the memory controller 1120 as shown in FIG. 1.

Figure 5:
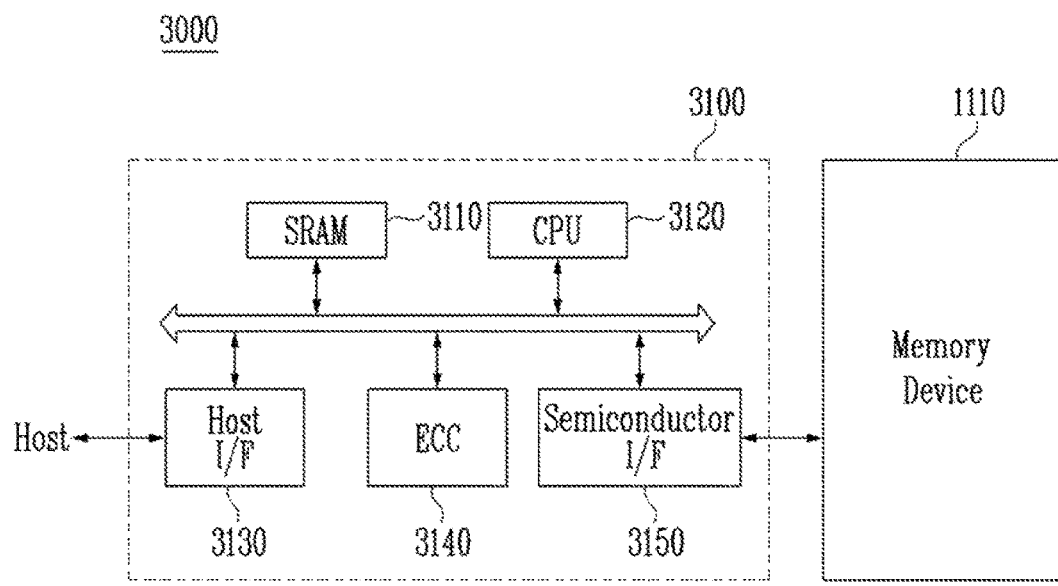
FIG. 5 is a simplified block diagram illustrating a memory system including a memory device, according to an embodiment of the present invention.

FIG. 5 is a simplified block diagram Illustrating a memory system 3000 including a memory device 1110 according to an embodiment of the present invention. Since the memory device 1110 may be configured in substantially the same manner as the memory device 1110 shown in FIG. 2, a detailed description thereof will be omitted.

Referring to FIG. 5, the memory system 3000 may include a memory controller 3100 and the memory device 1110. The memory controller 3100 may be configured to control the memory device 1110. A static random access memory (SRAM) 3110 may be used as a working memory of a central processing unit (CPU) 3120. A host interface 3130 (Host I/F) may include a data exchange protocol of the host coupled to the memory system 3000. An error correction circuit (ECC) 3140 provided in the memory controller 3100 may detect and correct errors in data read from the memory device 1100. A semiconductor interface 3150 may interface with the memory device 1110. The CPU 3120 may perform a control operation for data exchange of the memory controller 3100. In addition, although not illustrated in FIG. 5, a read only memory (ROM) for storing code data for interfacing with the host may be provided in the memory system 3000. The various circuits of the controller 3100 may be linked together with an internal bus.

The memory system 3000 may be applied to one of a computer, an ultra mobile PC (UMPC), a workstation, a net-book, a personal digital assistant (PDA), a portable computer, a web tablet, a wireless phone, a mobile phone, a smartphone, a digital camera, a digital audio recorder, a digital audio player, a digital picture recorder, a digital picture player, a digital video recorder, a digital video player, a device of transmitting and receiving information in a wireless environment, various devices constituting a home network and the like.

Figure 6:
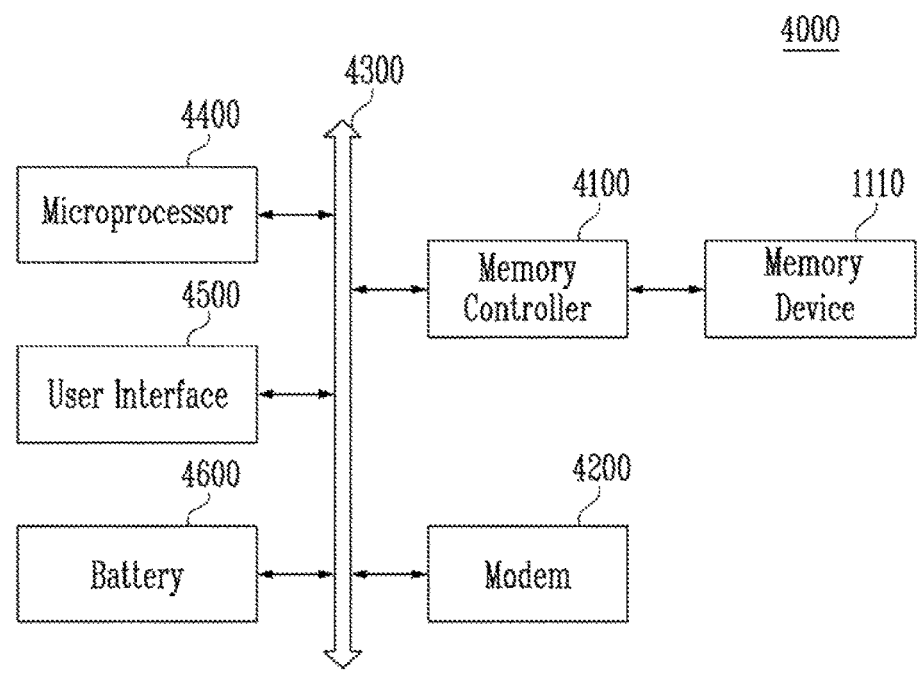
FIG. 6 is a simplified block diagram illustrating a computing system including a memory device, according to an embodiment of the present invention.

FIG. 6 is a simplified block diagram illustrating a computing system 4000 including a memory device 1110, according to an embodiment of the present invention. Since the memory device 1110 is configured in substantially the same manner as the memory device 1110 shown in FIG. 2, a detailed description thereof will be omitted.

Referring to FIG. 6, the computing system 4000 may include the memory device 1110, a controller 4100, a modem 4200, a microprocessor 4400, and a user interface 4500 which are electrically coupled to a bus 4300. When the computing system 4000 is a mobile device, a battery 4600 for supplying an operation voltage of the computing system 4000 may be additionally provided. The computing system 4000 may include an application chip set (not shown), a camera image processor (not shown), a mobile DRAM (not shown), and the like.

The memory controller 4100 and the semiconductor device 1000 may be components of an SSD.

The memory controller 4100 and the memory device 1110 may be mounted using various packages, including, for example, packages such as package on package (POP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), system in package (SIP), multi-chip package (MCP), wafer-level fabricated package (WFP), wafer-level processed stack package (WSP), and the like.

According to an embodiment of the present invention, read information may be quickly outputted with no restrictions of operating speed and timing by outputting variable information which may vary depending upon an operating state of a memory device and invariable product Information by using a single clock.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. A memory system, comprising:
a memory device storing data;
a memory controller receiving a request from a host, controlling the memory device according to the request, and communicating between the memory device and the host, the memory device comprising:
an enable signal generation unit generating an enable signal in response to a command output from the memory controller;
a fix code storage unit storing product information of the memory device, wherein the product information is not varied;
a logic code generation unit generating variable information of the memory device; and
an output unit combining the product information from the fix code storage unit with the variable information from the logic code generation unit and outputting the combined information in response to the enable signal,
wherein the enable signal generation unit, the fix code storage unit, the logic code generation unit and the output unit are included in a control logic which receives the command from the memory controller and operates the memory device, the output unit being operated in response to a single internal clock used in the control logic for operating the memory device, and
wherein the output unit outputs the combined information using the single internal clock.

2. The memory system of claim 1, wherein the product information does not change regardless of an operation and/or a state of the memory device.

3. The memory system of claim 1, wherein the product information includes at least one of a manufacturing information and a specification information of the memory device.

4. The memory system of claim 1, wherein the product information is stored in the fix code storage unit during a manufacturing process of the memory device.

5. The memory system of claim 1, wherein the variable information includes information varying depending upon an operation and/or a state of the memory device.

6. The memory system of claim 1, wherein the variable information includes at least one of a voltage information about voltages used for various operations performed by the memory device, a cycling number information and bad block information.

7. The memory system of claim 1, wherein the enable signal generation unit outputs the enable signal in response to the command to output the combined information.

8. The memory system of claim 1, wherein the output unit receives the product information and the variable information and outputs the combined information by combining the product information with the variable information in response to the enable signal.

9. The memory system of claim 1, wherein the memory device is a flash memory.

10. A memory device, which stores data and is controlled by a memory controller communicating between the memory device and a host, comprising:
- a plurality of memory blocks storing data;
- a peripheral circuit performing at least one of a program operation, a read operation and an erase operation on the plurality of memory blocks; and
- a control logic controlling the peripheral circuit,
- wherein the control logic combines product information, which is not varied, of the memory device with variable information of the memory device in response to a command output from the memory controller, and outputs combined information including the product information and the variable information to the memory controller in response to a single internal clock that is used in the control logic for operating the memory device.

11. The memory device of claim 10, wherein the control logic comprises:
- an enable signal generation unit generating the enable signal in response to the command;
- a fix code storage unit storing the product information;
- a logic code generation unit generating a logic code; and
- an output unit combining the product information with the variable information and outputting the combined information in response to the enable signal.

12. The memory device of claim 10, wherein the product information does not change regardless of an operation and a state of the memory device and includes at least one of manufacturing information and specification information of the memory device.

13. The memory device of claim 10, wherein the product information is stored in the control logic during a manufacturing process of the memory device.

14. The memory device of claim 10, wherein the variable information includes one information varying depending on an operation and/or a state of the memory device.

15. The memory device of claim 10, wherein the variable information includes at least one of a voltage information about voltages used for various operations performed by the memory device, cycling number information, and bad block information.

16. A method of operating a memory device, which stores data and is controlled by a memory controller communicating between the memory device and a host, the method comprising:
- storing product information of the memory device, wherein the product information is not varied;
- generating variable information of the memory device;
- generating read information by combining the product information with the variable information; and
- outputting the combined information in response to a single internal clock of the memory device, wherein the single internal clock is used in a control logic for operating the memory device.

17. The method of claim 16, wherein the product information is maintained regardless of an operation and/or a state of the memory device, and the variable information is updated by an operation of the memory device.

18. The method of claim 16, wherein the product information includes at least one of a manufacturing information and a specification information of the memory device, and
- wherein the variable information includes at least one of voltage information about voltages used for various operations performed by the memory device, cycling number information, and bad block information.

* * * * *